(12) United States Patent
Hoymann et al.

(10) Patent No.: US 9,660,720 B2
(45) Date of Patent: May 23, 2017

(54) SELF-OPTIMIZING REPEATER

(75) Inventors: Christian Hoymann, Aachen (DE); Magnus Almgren, Sollentuna (SE); Per Skillermark, Stockholm (SE); Arne Simonsson, Gammelstad (SE); Riitta Almgren, legal representative, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1536 days.

(21) Appl. No.: 13/003,123

(22) PCT Filed: Jul. 10, 2008

(86) PCT No.: PCT/EP2008/059041
§ 371 (c)(1),
(2), (4) Date: Nov. 11, 2011

(87) PCT Pub. No.: WO2010/003462
PCT Pub. Date: Jan. 14, 2010

(65) Prior Publication Data
US 2012/0106340 A1    May 3, 2012

(51) Int. Cl.
*H04J 1/16* (2006.01)
*H04B 7/26* (2006.01)
*H04B 7/155* (2006.01)

(52) U.S. Cl.
CPC ....... *H04B 7/2606* (2013.01); *H04B 7/15528* (2013.01)

(58) Field of Classification Search
None
See application file for complete search history.

(56) References Cited

U.S. PATENT DOCUMENTS

| 5,623,496 A | 4/1997 | Sagi |
| 5,812,933 A | 9/1998 | Niki |
| 5,832,365 A | 11/1998 | Chen et al. |
| 5,987,304 A | 11/1999 | Latt |
| 6,768,897 B1 | 7/2004 | Suonvieri |

(Continued)

FOREIGN PATENT DOCUMENTS

| EP | 0681374 A1 | 11/1995 |
| EP | 0806847 A2 | 11/1997 |

(Continued)

*Primary Examiner* — Willie J Daniel, Jr.
(74) *Attorney, Agent, or Firm* — Coats & Bennett, PLLC (57) ABSTRACT

The object of the present invention is to reduce interference and power consumption of a repeater operated in a wireless communication network. According to the present invention this object is achieved by a self-optimizing repeater (10) for use in a wireless communication network using predetermined carrier communication resources per cell. The self-optimizing repeater (10) comprises an amplifier (12) adapted to amplify a first subset of communication resources selected from, the carrier communication resources, a monitoring unit (14) adapted to monitor traffic load on the first subset of communication resources, and an adjustment unit (16) adapted to adjust the first subset of communication resources as a function of the monitored traffic load. The operation of the self-optimizing repeater is fully transparent and no control signaling is necessary to control the self-optimizing repeater.

14 Claims, 7 Drawing Sheets

(56) References Cited

U.S. PATENT DOCUMENTS

| | | | |
|---|---|---|---|
| 8,032,146 B2* | 10/2011 | Zhu et al. | ............... 455/450 |
| 2007/0015462 A1 | 1/2007 | Dean | |
| 2007/0184777 A1 | 8/2007 | Tanoue | |
| 2008/0075178 A1* | 3/2008 | Lappetelainen et al. | ..... 375/260 |
| 2010/0227620 A1* | 9/2010 | Naden et al. | ............. 455/445 |

FOREIGN PATENT DOCUMENTS

| | | |
|---|---|---|
| JP | 55147042 A | 11/1980 |
| JP | 58040938 A | 3/1983 |
| JP | 60250736 A | 12/1985 |
| JP | 04-109719 A | 4/1992 |
| JP | 07-284156 A | 10/1995 |
| JP | 09298521 A | 11/1997 |
| JP | 11112399 A | 4/1999 |
| JP | 2000505263 A | 4/2000 |
| JP | 2001518739 A | 10/2001 |
| JP | 2005184104 A | 7/2005 |
| JP | 2005303613 A | 10/2005 |
| JP | 2007129670 A | 5/2007 |
| JP | 2009502056 A | 1/2009 |
| WO | 89/10660 | 11/1989 |
| WO | 9917476 A2 | 4/1999 |
| WO | 2005122615 A1 | 12/2005 |
| WO | 2007011869 A1 | 1/2007 |
| WO | 2008004916 A1 | 1/2008 |
| WO | 2009076994 A1 | 6/2009 |

* cited by examiner

SELF-OPTIMIZING REPEATER

FIELD OF INVENTION

The present invention relates to a self-optimizing repeater being operated in a wireless communication network, to a radio access sub-system of the wireless communication network using the self-optimizing repeater, and to a method of operating the self-optimizing repeater.

BACKGROUND ART

In US 2003/0236067 A1 there is described a repeater with digital channelizer. In order to retransmit a communication channel at a specific frequency which remains constant over time, a receiver may receive a signal including a specific frequency of the communication channel. An analog to digital converter generates a digital signal correlated to the received signal that may be passed through a digital filter to filter the digital signal and pass frequency components at or around the frequency of the communication channels specific frequency. A digital to analog converter may generate an analog signal correlated to the filtered digital signal and a transmitter may transmit the analog signal.

Further, in US 2007/0015462 A1 there is described a time division duplex TDD controlled repeater. The TDD repeater comprises a scheduling component that analyzes a scheduling relating to when communications are active in the forward link direction and when communications are active in the reverse link direction, wherein the communications are subject to time division multiplexing. An amplifier amplifies received communications as a function of the schedule. The repeater can comprise a configuration component that configures the amplifier to amplify the received communications in one or more of a forward link direction and a reverse link direction.

Figure 1:
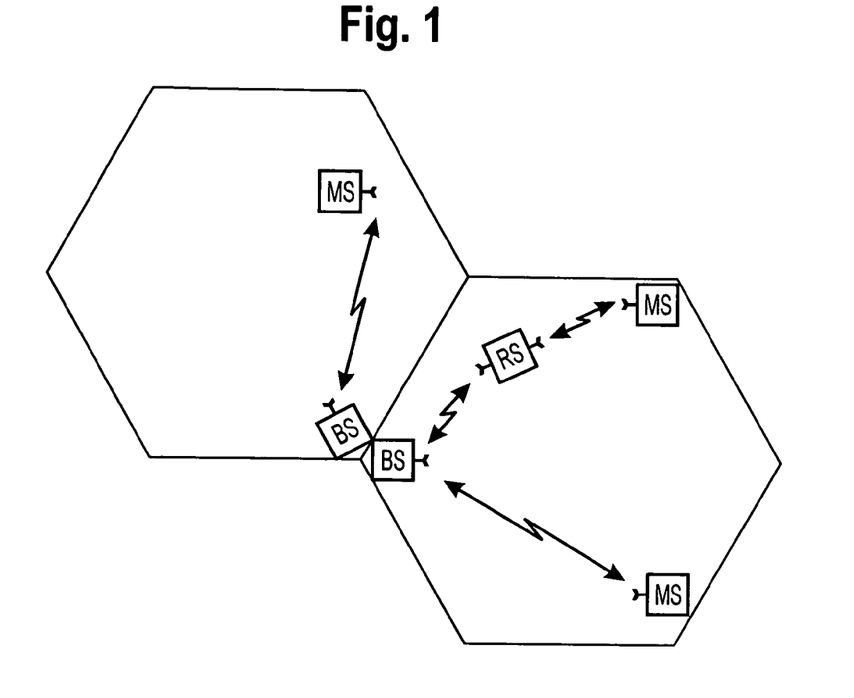
FIG. 1 shows a basic principle for the operation of a repeater in a wireless communication network.

FIG. 1 shows a basic principle for the operation of a repeater in a wireless communication network.

As shown in FIG. 1, repeaters are widely used in wireless communication networks in order to re-amplify electromagnetic signals. Repeaters receive, amplify and retransmit signals of a particular channel. The amplified signals can propagate over longer distances or it provides better quality, i.e., better signal to noise and interference ratios than the original signals. Repeaters are also known as layer-1 relay or amplify-and-forward relay.

Further, the amplified signals can either be transmitted on different frequency bands when compared to the frequency bands of the original signals through frequency translating or they can be transmitted on the same frequency band, so-called on-frequency. In the latter case self interference has to be avoided, e.g., by means of separated antennas, self-interference cancellation techniques, or by electronic components such as circulators.

As shown in FIG. 1, repeaters amplify resources with the desired carrier signal towards users on the downlink DL or from users on the uplink UL that need repeater support.

However, conventional repeaters continuously amplify the entire channel bandwidth. Even if resources, e.g., TDMA time slots, FDMA sub-channels, or OFDMA resource blocks are currently not used or if resources do not need repeater support, repeaters amplify them. Thus, energy is wasted whenever the repeater amplifies these resources.

Figure 2:
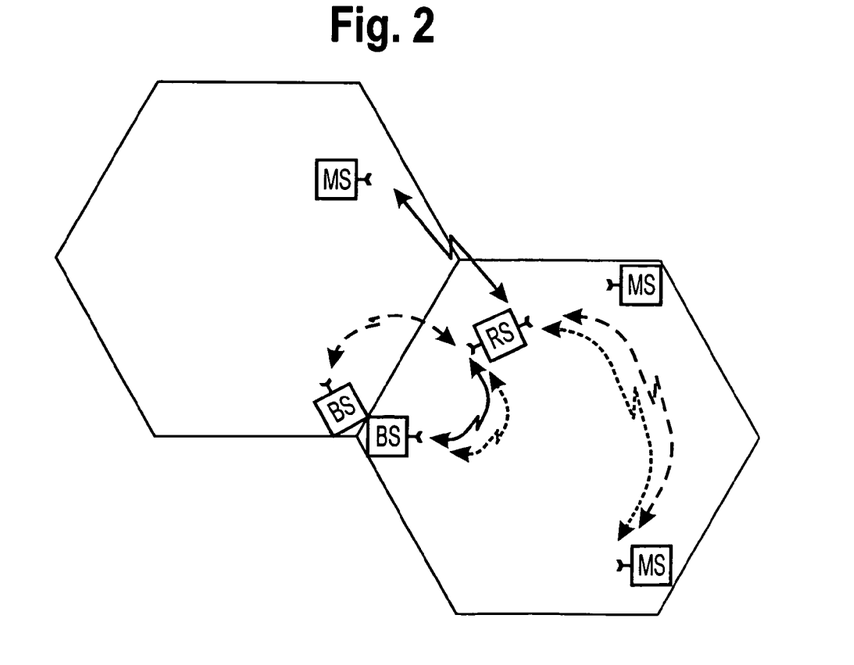
FIG. 2 shows the generation of undesired interference signals generated by a repeater operated in a wireless communication network.

FIG. 2 shows the generation of undesired interference signals generated by a repeater operated in a wireless communication network.

As shown in FIG. 2, repeaters also amplify resources without a desired signal. Undesired signals on these resources are for instance:

Interference from a neighbouring cell, which is amplified by the repeater. This degrades the signal quality within the cell. As shown in FIG. 2 this happens for the solid line in UL and the dashed line in DL.

Carrier signals from users that do not need repeater support are amplified. These amplified signals cause interference to neighbouring cells. As shown in FIG. 2 this happens for the solid line on the downlink DL and for the dashed line on the uplink UL. Further, if the processing delay introduced by an on-frequency repeater exceeds the allowed limit, the amplified signal interferers with the original one. In FIG. 2 this is illustrated by the dotted line for the downlink DL and the uplink UL.

The receiver noise of the repeater is amplified, which causes interference within the cell and towards neighbouring cells.

Further, in conventional repeaters the transmit power of a repeater is equally distributed across the amplified channel. The power amplifier limits the power spectral density of the amplified signal.

Still further, the radio base station may control the repeater via a dedicated control channel. This control channel could tell the repeaters to turn resources on and off. However, the control channel needs to be standardized and it consumes radio resources. Further, a control channel increases the complexity of the radio base station. Due to the necessity to decode control messages the repeater would require baseband processing capabilities. This increases the repeater complexity, too.

SUMMARY OF INVENTION

In view of the above the object of the present invention is to provide an improved repeater.

According to the present invention this object is achieved by a self-optimizing repeater for use in a wireless communication network using predetermined carrier communication resources per cell, comprising an amplifier adapted to amplify a first subset of communication resources selected from the carrier communication resources, a monitoring unit adapted to monitor traffic load on the first subset of communication resources, and an adjustment unit adapted to adjust the first subset of communication resources as a function of the monitored traffic load.

Further, the object of the present invention as outlined above is achieved by a radio access sub-system for use in a wireless communication network using predetermined carrier communication resources per cell, comprising a radio base station adapted to schedule communication resources for wireless communication with at least one mobile terminal and a self-optimizing repeater according to the present invention being adapted to support wireless communication with the mobile terminal.

Therefore, the present invention is related to a transparent approach for the realization of the radio access sub-system. The self-optimizing repeater operates autonomously without any control through the radio base station. The radio base station simply monitors improved communication quality for those communication resources supported by the self-optimizing repeater and triggers the scheduling of the communication resources accordingly.

Further, the object of the present invention as outlined above is achieved by a method of operating a self-optimizing repeater in a wireless communication network using predetermined carrier communication resources per cell, comprising the steps amplifying a first subset of communication resources selected from the carrier communication resources, monitoring a traffic load on the first subset of communication resources, and adjusting the first subset of communication resources as a function of the monitored traffic load.

BRIEF DESCRIPTION OF DRAWING

In the following the best mode as well as preferred embodiments of the present invention will be described through reference to the drawing in which.

DESCRIPTION OF PREFERRED EMBODIMENTS

In the following the present invention will be described with respect to embodiments thereof. Insofar as different functionality of the present invention is explained, it should be clear that any such functionality may be implemented either in software or hardware and/or a combination thereof.

Figure 3:
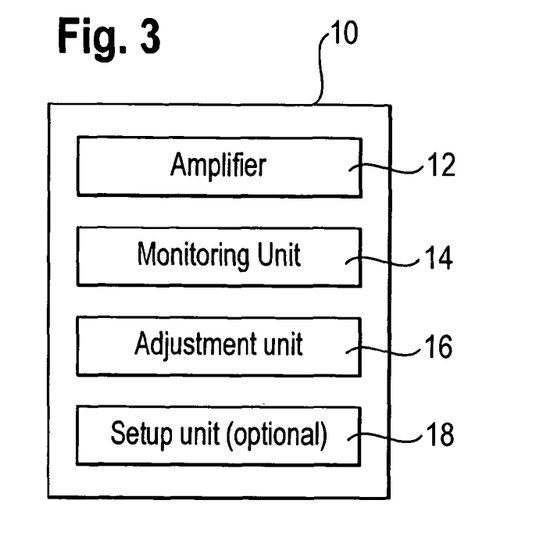
FIG. 3 shows a schematic diagram of the self-optimizing repeater according to the present invention.

FIG. 3 shows a schematic diagram of the self-optimizing repeater according to the present invention. The self-optimizing repeater is provided for use in a wireless communication network using predetermined carrier communication resources per cell.

As shown in FIG. 3, the self-optimizing repeater 10 comprises an amplifier 12, a monitoring unit 14, and an adjustment unit 16. Optionally, the self-optimizing repeater may also comprise a setup unit 18.

Figure 4:
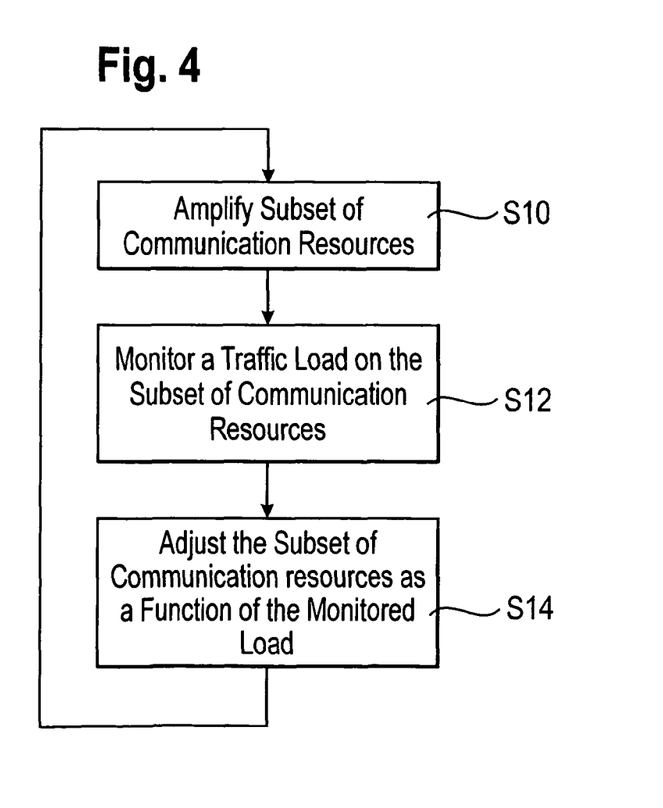
FIG. 4 shows a flowchart of operation for the self-optimizing repeater shown in FIG. 3.

FIG. 4 shows a flowchart of operation for the self-optimizing repeater shown in FIG. 3.

As shown in FIG. 4, operatively the amplifier 12 executes a step S10 to amplify a first subset of communication resources selected from the carrier communication resources.

By focusing the transmission power to certain frequency resources, e.g., to subcarriers in OFDMA or to sub-channels in FDMA, the power spectral density can be increased. This either allows the use of less powerful and less expensive amplifiers in the self-optimizing repeater or it allows to increase the signal quality and range.

The step S10 may be executed in a way to continuously amplify a second subset of communication resources, e.g., used for control signaling, wherein the continuously amplified second subset of communication resources is different from the first subset of communication resources.

As shown in FIG. 4, operatively the monitoring unit 14 executes a step S12 to monitor traffic load on the first subset of communication resources.

The step S12 may be executed by measuring the total input or output power of the amplifier 12 or by measuring the received or transmitted power per communication resource in the first subset of communication resources.

Here, when the total input or output power of the amplifier 12 is considered and when all communication resources are idle, the power consumption will go down because nothing besides noise and interference is amplified. Therefore, fewer communication resources should be amplified in the future. When all communication resources are occupied by carrier signals, power consumption of the amplifier 12 increases. Therefore, more resources should be amplified in the future.

Alternatively, when the received power per communication resource is measured the execution of step S12 requires a calculation of the energy spectral density of the received signal. This implies complex processing, but the measure is more accurate.

In conclusion, different methods may be used for the execution of step S12 to monitor the utilization of communication resources amplified by the amplifier 12 of the self-optimizing repeater 10. As outlined above, these methods detect a high/low load situation in order to extend/reduce the number of amplified communication resources.

As shown in FIG. 4, operatively the adjustment unit 16 executes a step S14 to adjust the first subset of communication resources as a function of the monitored traffic load.

The step S14 may be executed in a way to extend the first subset of communication resources when monitoring a high traffic load and to reduce the first subset of communication resources when monitoring a low traffic load.

Preferably, the step S14 is executed so as to maintain adjacency of communication resources within the first subset of communication resources.

Further, the step S14 may be executed in a way to increase the amplification of the first subset of communication resources when monitoring a high traffic load and to decrease the amplification of the first subset of communication resources when monitoring a low load situation. Here, the modification of the amplification may also be combined with the extension or reduction of communication resources explained above.

Further, the step S14 may be executed according to an operation time scale being larger than a scheduling time scale used in the base station for scheduling of communication resources.

In the embodiments above, the self-optimizing repeater 10 autonomously turns on and off resources, which are composed of certain frequency channels and certain time slots, in a transparent way. This adjustment allows the self-optimizing repeater 10 to adapt to varying traffic demands. A certain set of resources is always turned on to enable probing of the repeater path between mobile terminal and radio base station. The expansion and reduction of amplified resources is performed in a way optimized to the access standard, such as FDD, TDD, OFDMA FDMA, TDMA and scheduling principles, such as frequency and/or time dependent scheduling.

Further, the present invention is applicable in all wireless communication networks in which a channel aware scheduler in a radio base station dynamically allocates resources in time and/or frequency. This can be done, e.g., by means of different multiple access strategies such as time division multiple access TDMA, frequency division multiple access FDMA and/or orthogonal frequency multiple access OFMDA, by means of dynamic frequency selection or by means of cognitive radios. E.g., 3GPP long term evolution LTE is one candidate system for self-optimizing repeaters. Long term evolution LTE offers channel aware scheduling that can exploit the time and the frequency domain. According to its OFDMA and SC-FDMA transmission schemes, resources can be dynamically allocated in time and in frequency.

Further, it should be noted that the solution according to the present invention is fully transparent. No control channel is needed to control the self-optimizing repeater 10. I.e., the self-optimizing repeater 10 optimizes the capacity in the wireless communication network autonomously. Hence, the underlying standards do not need to be changed and operation is possible with multiple wireless systems. Further, legacy terminals receive full support.

Still further, it should be noted that the proposed self-optimizing repeater 10 reduces the interference that is introduced by the self-optimizing repeater. This directly leads to higher system capacity or wider coverage.

According to an embodiment of the present invention the amplifier 12 is adapted to continuously amplify a second subset of communication, wherein the continuously amplified second subset of communication resources is different from the first subset of communication resources. The second subset of communication resources may, e.g., be used for control signaling. Control signaling generally has a fixed assignment to communication resources so that it can be easily determined within the communication resources.

An advantage of this embodiment is that transmission of control signals being of particular relevance for the operation of the wireless communication network are always supported appropriately.

According to a further embodiment of the present invention the monitoring unit 14 is adapted to monitor traffic load by measuring the total input or output power of the amplifier 12 or by measuring the received or transmitted power per communication resource in the first subset of communication resources.

An advantage of this embodiment is that it allows for a correct yet efficient monitoring of the traffic load.

According to a further embodiment of the present invention the adjustment unit 16 is adapted to extend the first subset of communication resources when monitoring a high traffic load and to reduce the first subset of communication resources when monitoring a low traffic load.

According to this embodiment of the present invention it is possible to reduce the power consumption of the self-optimizing repeater 10. The reason for this is that the self-optimizing repeater 10 does not amplify resources that are currently unused. Alternatively, with a given power consumption, a higher power density per resource can be achieved.

Further, the mentioned advantages can be maintained in challenging environments such as varying traffic demands or dynamic user appearance. The self-optimizing repeater 10 dynamically adjusts its behaviour.

According to a further embodiment of the present invention the adjustment unit 16 is adapted to extend or reduce the first subset of communication resources while maintaining adjacency of communication resources within the first subset of communication resources.

An advantage of this embodiment of the present invention is that always continuous communication resources are supported by the self-optimizing repeater 10 so that the construction of the self-optimizing repeater 10 may be facilitated.

According to a further embodiment of the present invention the adjustment unit 16 is adapted to increase the amplification of the first subset of communication resources when monitoring a high traffic load and to decrease the amplification of the first subset of communication resources when monitoring a low load situation.

An advantage of this embodiment of the present invention is a further minimization of power consumption.

According to a further embodiment of the present invention the adjustment unit 16 is adapted to operate according to an operation time scale being larger than a scheduling time scale used for scheduling of communication resources.

An advantage of this embodiment of the present invention is that there is always enough time at the base station to achieve scheduling of communication resources in line with communication resource allocation at the self-optimizing repeater 10.

According to a further embodiment of the present invention the adjustment unit 16 is adapted to evaluate use of communication resources prior to extension of the first subset of communication resources.

An advantage of this embodiment of the present invention is that overload constellations within the self-optimizing repeater 10 may always be avoided and that extension of communication resources stops at maximum capacity of the self-optimizing repeater 10.

According to a further embodiment of the present invention the adjustment unit 16 is adapted to adjust the first subset of communication resources in a similar manner on the downlink and on the uplink.

This embodiment of the present invention supports consistency between communication resources supported by the self-optimizing repeater 10 on the uplink and on the downlink.

According to a further embodiment of the present invention the self-optimizing repeater 10 comprises a setup unit 18 adapted to configure an initial or maximum first subset of communication resources according to a pre-configuration during deployment of the self-optimizing repeater 10, according to a random configuration, or according to an interference level per communication resource.

Figure 5:
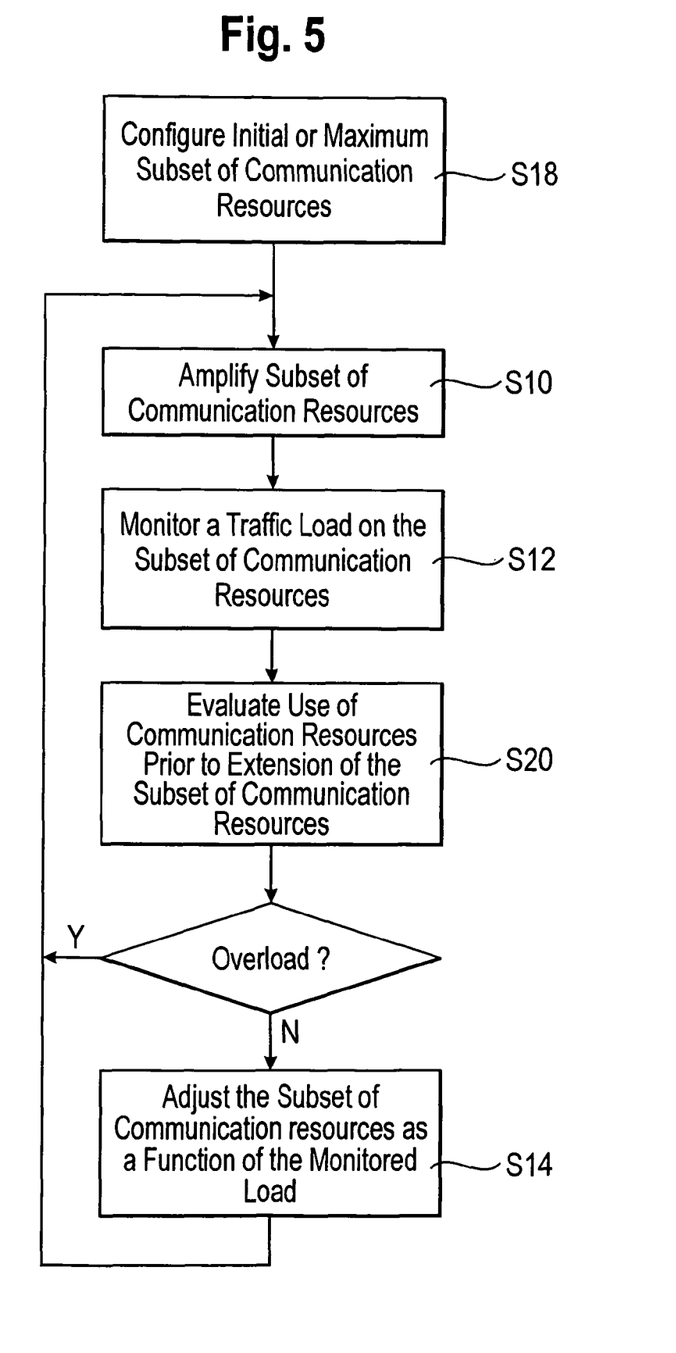
FIG. 5 shows a modified flowchart of operation for the self-optimizing repeater shown in FIG. 3.

FIG. 5 shows a modified flowchart of operation for the self-optimizing repeater shown in FIG. 3. The steps being identical to the steps shown in FIG. 4 are denoted using the same reference numerals and explanation thereof will not be repeated.

As shown in FIG. 5, operatively the setup unit 18 shown in FIG. 3 executes a step S18 prior to the execution of steps S10 to S14 to configure an initial or maximum first subset of communication resources according to a pre-configuration during deployment of the self-optimizing repeater, according to a random configuration, or according to an interference level per communication resource.

It should be noted that according to the present invention several self-optimizing repeaters 10 may be deployed in one single cell of the wireless communication network. If amplified communication resources of several self-optimizing repeaters 10 overlap in time and/or frequency, undesired signals might be amplified causing unnecessary energy consumption and interference. Hence, self-optimizing repeaters 10 could choose non-overlapping communication resources. Sometimes it might, however, be desirable that two self-optimizing repeaters amplify the same communication resources, e.g., to support multiple path transmission between a base station and a mobile terminal.

A further advantage may be is achieved by pre-configuring through the setup unit 18 of each self-optimizing repeaters 10 during deployment. Every self-optimizing repeater 10 is assigned to a well defined portion of the communication resources available in the channel. The self-optimizing repeater 10 takes care that all its amplified communication resources are located in that portion even if the self-optimizing repeater 10 adjusts the number of amplified communication resources. It should be noted that in wireless communication networks that exploit spatial reuse, e.g., by means of space division multiple access SDMA, overlapping communication resources might be beneficial. The configuration of self-optimizing repeater 10 should consider that.

Further, the set of amplified communication resources could be chosen by the setup unit 18 randomly. This method does not prevent an overlap of communication resources. However, it does not need any configuration.

Still further, other methods such as communication resources assignments based the actual interference level per communication resource are also possible. However, this method requires measurements and enhanced signal processing in order to measure the interference per communication resource.

As shown in FIG. 5, operatively the adjustment unit 16 executes a step S20 to evaluate use of communication resources prior to extension of the first subset of communication resources so as to avoid overload constellations.

Here, the algorithm to extend the number of amplified communication resources in case of full usage of amplified communication resources needs to consider the utilization of non-amplified communication resources as well. Especially in overload situations, where basically all communication resources are allocated, amplified communication resources might be allocated although repeater support is not desired. In that case a adjustment unit 16 should not extend the number of amplified resources.

Further to the explanations given above with respect to FIG. 3 to FIG. 5, it should be noted that generally the step S14 to adjust the first subset of communication resources may be executed in a similar manner on the downlink and on the uplink.

While above general principles of the present invention have been described with respect to FIG. 3 to FIG. 5, in the following more detailed aspects of the present invention will be explained with respect to FIG. 6 to FIG. 14.

Figure 6:
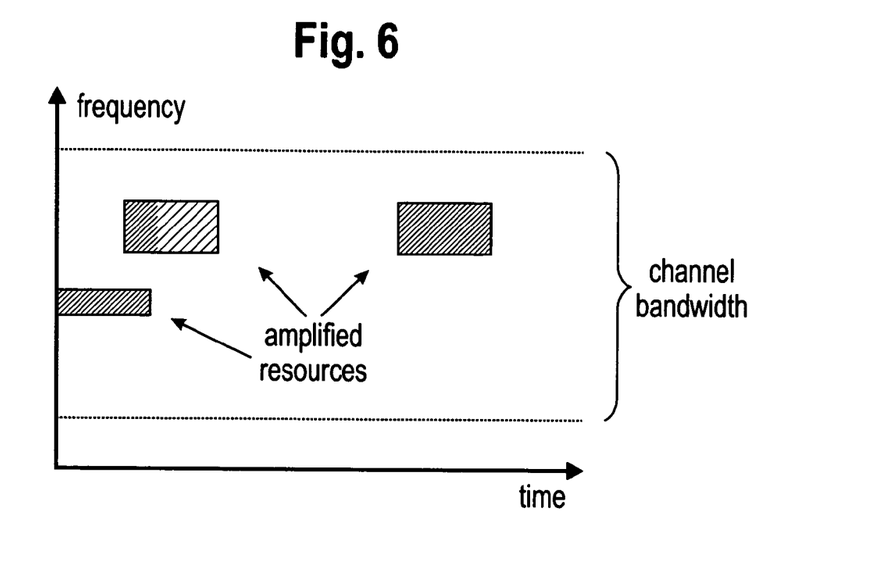
FIG. 6 shows a an example for a first subset of communication resources amplified by the self-optimizing repeater according to the present invention.

FIG. 6 shows an example for a first subset of communication resources amplified in step S10 by the amplifier 12 of the self-optimizing repeater 10 shown in FIG. 3. In more detail, FIG. 6 illustrates the limitation of amplified communication resources for subsequent selection of amplified communication resources through execution of a channel aware scheduling process.

As outlined above, the self-optimizing repeater 10 forms part of a radio access sub-system of a wireless communication network using predetermined carrier communication resources per cell. The radio access sub-system comprises a radio base station adapted to schedule communication resources for wireless communication with at least one mobile terminal being operated in the coverage area of the radio base station.

Alternatively, the scheduling of communication resources may also be executed in mobile terminals communicating with the radio base station. Insofar as the following explanations are give with respect to scheduling of communication resources in the radio base station it should be understood that these explanations also cover the execution of the scheduling process in mobile terminals.

Further, the self-optimizing repeater 10 supports wireless communication within at least a sub-area of the coverage area of the base station or it may extend the coverage area of the base station. As outlined above, the operation of the self-optimizing repeater 10 is autonomous with respect to the operation of the radio base station.

Generally, the self-optimizing repeater supports only a part of the coverage area of the radio base station and needs also only support a subset of mobile terminals within a cell of the wireless communication network. From this, it is sufficient that the amplifier 12 of the self-optimizing repeater 10 amplifies only a first subset of communication resources available in the cell covered by the radio base station.

As shown in FIG. 6, in order not to amplify too many undesired communication resources the amplifier 12 of the self-optimizing repeater 10 amplifies only a subset of all available resources of the channel. All other communication resources available in the given channel are not supported by the self-optimizing repeater 10.

As shown in FIG. 6, a communication resource may be defined by a certain frequency and/or time bound where the bounds are equal than or more restrictive than the bounds of the available channel. In TDMA systems a resource is a time slot, in FDMA it is a sub-channel, and in OFDMA systems a resource consists of one or more subcarriers and one or more OFDM symbol durations.

On the other hand, at the radio base station, based on gathered channel state information, the scheduling process will recognize that the channel towards a certain mobile terminal or from a certain mobile terminal is improved on certain communication resources through operation of the self-optimizing repeater 10. The channel aware scheduler in the radio base station will therefore allocate these communication resources for the particular mobile terminal. For mobile terminals that do not see or report an improved channel, the scheduling process will not allocate these particular communication resources.

Therefore, mobile terminals that benefit from the operation of the self-optimizing repeater 10 will be served on communication resources amplified by the amplifier 12 of the self-optimizing repeater 10. Mobile terminals that do not benefit from the operation of the self-optimizing repeater 10 or mobile terminals that are even degraded by the operation of the self-optimizing repeater 10, will avoid the amplified communication resources.

As a result, the self-optimizing repeater 10 leverages the time and/or frequency selective scheduler in the radio base station. As outlined above, in wireless communication networks the channel aware scheduling may also be executed in mobile terminals and in this case the self-optimizing repeater 10 leverages the time and/or frequency selective scheduler in the mobile terminals.

Further, it should be noted that the scheduling process does not use information why the channel has improved on certain communication resources, it simply sees the improvement. Further, the self-optimizing repeater 10 is transparent for the radio base station as well as for the mobile terminal.

Further, it should be noted that the present invention is also transparent to multi-antenna transmissions. All nodes in the wireless communication network, i.e., radio base station, self-optimizing repeater 10 or mobile terminal, could be equipped with multi-antennas. Like for the single-antenna transmission, the channel aware scheduling process will allocate the most appropriate communication resources to the multi-antenna transmission.

Here, it does not matter whether the channel is favourable on these communication resources due to the operation of the self-optimizing repeater 10 or due to good natural propagation conditions. E.g., using beam-forming, the best suited fixed or adaptive beam would be chosen for a particular mobile terminal. For some mobile terminals the communication path might go through the self-optimizing repeater 10 so that the beam points to the self-optimizing repeater 10 rather than to the mobile terminal. For other mobile terminals the communication path will be a direct one so that the beam is optimized for the mobile terminal.

Further, diversity coding techniques may even exploit the diversity given by the fact that transmissions on some communication resources are amplified by the self-optimizing repeater and others are not. The resulting channels on those communication resources will be uncorrelated, which offers diversity gain in time and/or frequency.

Figure 7:
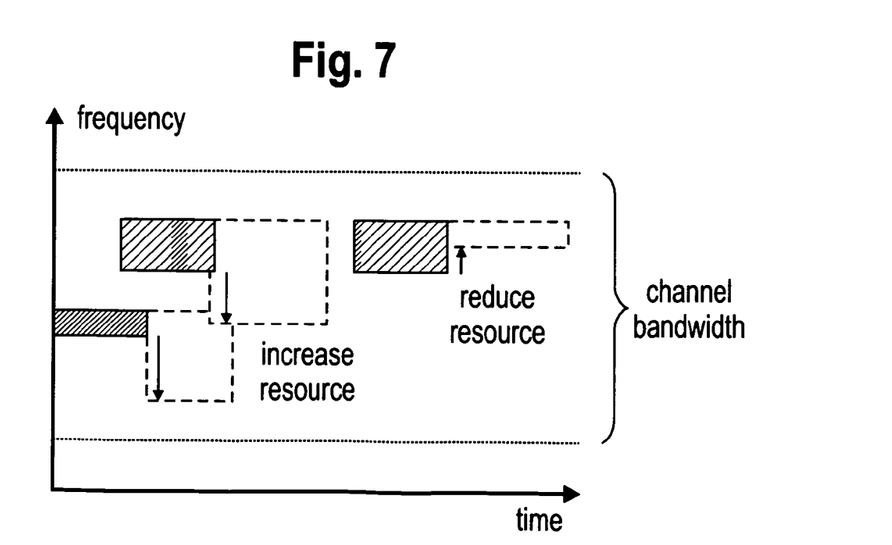
FIG. 7 shows an example of dynamic adjustment of a first subset of communication resources amplified by the self-optimizing repeater according to the present invention.

FIG. 7 shows an example of dynamic adjustment of a first subset of communication resources amplified by the self-optimizing repeater 10 according to the present invention. Such dynamic adjustment is achieved by the adjustment unit 16 shown in FIG. 3 through execution of the adjustment step S14 shown in FIG. 4.

Generally, traffic and in particular data traffic in wireless communication systems is highly varying and bursty. It changes due to individual users' demands, due to the number of supported users, or due to connection admission control or prioritization of a controlling entity. Traffic that needs support of the self-optimizing repeater 10 therefore varies accordingly.

As shown in FIG. 7, in order to adjust to varying traffic demands, the self-optimizing repeater 10 dynamically adjusts the number of amplified communication resource blocks. The monitoring unit 14 of the self-optimizing repeater 10 continuously monitors the usage of its amplified communication resources.

As shown in FIG. 7, whenever the majority of its amplified communication resources are used, the adjustment unit 16 of self-optimizing repeater 10 expands the number of amplified communication resources. To the contrary, when only a small fraction of the amplified communication resources are used the adjustment unit 16 of the self-optimizing repeater 10 reduces its number.

Further, whenever the adjustment unit 16 of the self-optimizing repeater 10 adjusts the number of amplified communication resources, the channel aware scheduling process executed in the radio base station or at least one mobile terminal will recognize that the channel looks good on more or on fewer communication resources. The scheduling process will allocate future communication resource grants accordingly. Again, the self-optimizing repeater 10 leverages the time and/or frequency selective scheduler.

It should be noted that the time scale of the dynamic adjustment by the self-optimizing repeater should be larger than the time scale of the channel aware scheduling process. Otherwise amplified resources could not be detected and assigned by the scheduling process.

Figure 8:
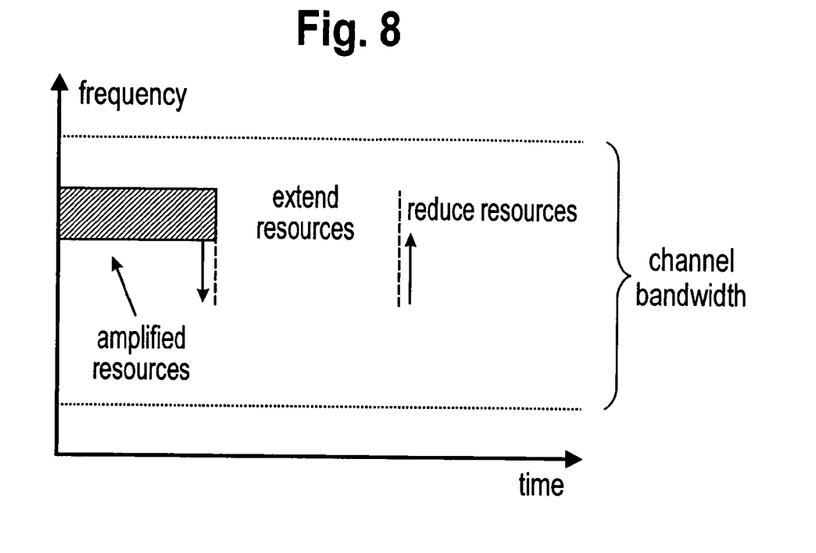
FIG. 8 shows an example of amplified communication resources, adjacent in frequency and subsequent in time, according to the present invention.

FIG. 8 shows an example of amplified communication resources, adjacent in frequency and subsequent in time, according to the present invention. As outlined above, such dynamic adjustment is achieved by the adjustment unit 16 shown in FIG. 3 through execution of the adjustment step S14 shown in FIG. 4.

As shown in FIG. 8, one embodiment of the self-optimizing repeater 10 according to the present invention amplifies subcarriers which are adjacent. The reason for this is that a tuneable band-pass filter that adapts the size of the amplified spectral band allows for steeper slopes which reduce out-of-band emissions. Otherwise, separate communication resources which are scattered in the frequency domain may not be amplified accurately enough.

Generally, the boundaries of the amplified communication resources should match with the minimum granularity of resource allocation offered by the wireless communication network.

E.g., in 3GPP-LTE the smallest schedulable communication resource is a resource block. In view of this, boundaries of amplified communication resources should match with the boundaries of communication resource blocks. Coarse synchronization in frequency will be necessary to achieve this. Also, channel boundaries should be met.

As another example, in current FDMA or OFDMA systems the scheduling process is only frequency selective. The time dependent behaviour of the channel is exploited by performing the scheduling process frequently. Hence, the scheduling time scale, e.g., for channel estimation, channel feedback, scheduling decision, and actual transmission, is usually smaller than the channel coherence time. Further, channel feedback is given only for the frequency domain, i.e., each sub-channel reports its channel state. The channel variations in time can only be monitored by gathering subsequent sub-channel reports. As a consequence, communication resources that are amplified by the amplifier 12 of the self-optimizing repeater 10 should be subsequent in time.

Further, the self-optimizing repeater 10 depends on frequency- and time-selective channel knowledge at the scheduler. The better the channel knowledge, the better is the channel-dependent resource allocation and the better is the support by the self-optimizing repeater 10. Hence, detailed mechanisms to acquire channel knowledge are required. On the uplink UL, the radio base station implicitly gathers channel knowledge on communication resources currently allocated to terminals. In order to gather channel knowledge on all communication resources of the channel, an LTE radio base station can request uplink UL channel sounding signals. On the downlink DL, channel knowledge is available at the mobile terminal. An LTE mobile terminal can report a limited number of channel quality indicators COI in the physical uplink control channel PUCCH. However, it could be beneficial to request a more detailed CQI report on the physical uplink shared channel PUSCH.

As shown in FIG. 8, when adjusting the number of communication resources, the self-optimizing repeater 10 preferably maintains the adjacent nature of communication resources, e.g., communication resources that are adjacent in frequency and subsequent in time. In that example shown in FIG. 8 the self-optimizing repeater 10 adjusts the lower bound to extend or reduce the number of amplified communication resources.

Figure 9:
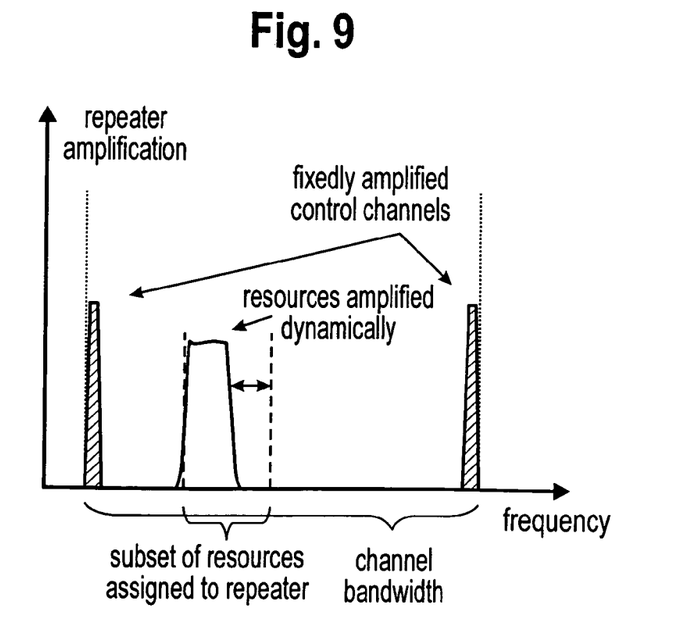
FIG. 9 shows a spectral mask with fixed and dynamic communication resources handled by the self-optimizing repeater according to the present invention.

FIG. 9 shows a spectral mask with fixed and dynamic communication resources handled by the self-optimizing repeater 10 according to the present invention.

As outlined above, the operation of the self-optimizing repeater 10 relies on a frequency- and time-selective resource allocation. It neither guarantees self-optimizing repeater support in the frequency domain nor in the time domain.

As shown in FIG. 9, transmissions, especially control channels, have a fixed resource allocation. In order to avoid misbehaviour of the self-optimizing repeater 10, a first option is to apply the self-optimizing repeater system only to communication resources using frequency- and time selective allocation, e.g., data channels. Regarding control channels mobile terminal control is provided by the base station directly without relying on the self-optimizing repeater 10 while data transmission might be enhanced by the self-optimizing repeater 10.

As a second option, depending on the access type and standard, control signals that are essential for operation might always be transmitted on particular communication resource and therefore be amplified in a fixed manner by the self-optimizing repeater 10. In other words, the allocation of particular communication resources for control signals does not depend on, e.g., a state of data channel; it is fixed and may be pre-configured into the self-optimizing repeater 10 prior to operation thereof. This allows to increase the original base station coverage.

As shown in FIG. 9, uplink UL control signalling in LTE is always transmitted on the highest and on the lowest resource blocks available in the channel. Under such conditions, a self-optimizing repeater 10 would always amplify this selected set of communication resources in a fixed manner.

As shown in FIG. 9 with respect to LTE, only a portion of the entire channel bandwidth has been assigned to the self-optimizing repeater 10. The amplified communication resources are adjacent and located in the assigned subset. Apart from that, necessary communication resources, e.g., carrying control signals, are amplified in a fixed manner. In FIG. 9 these fixed resources are located at the upper and lower bound of the channel bandwidth (LTE UL).

Figure 10:
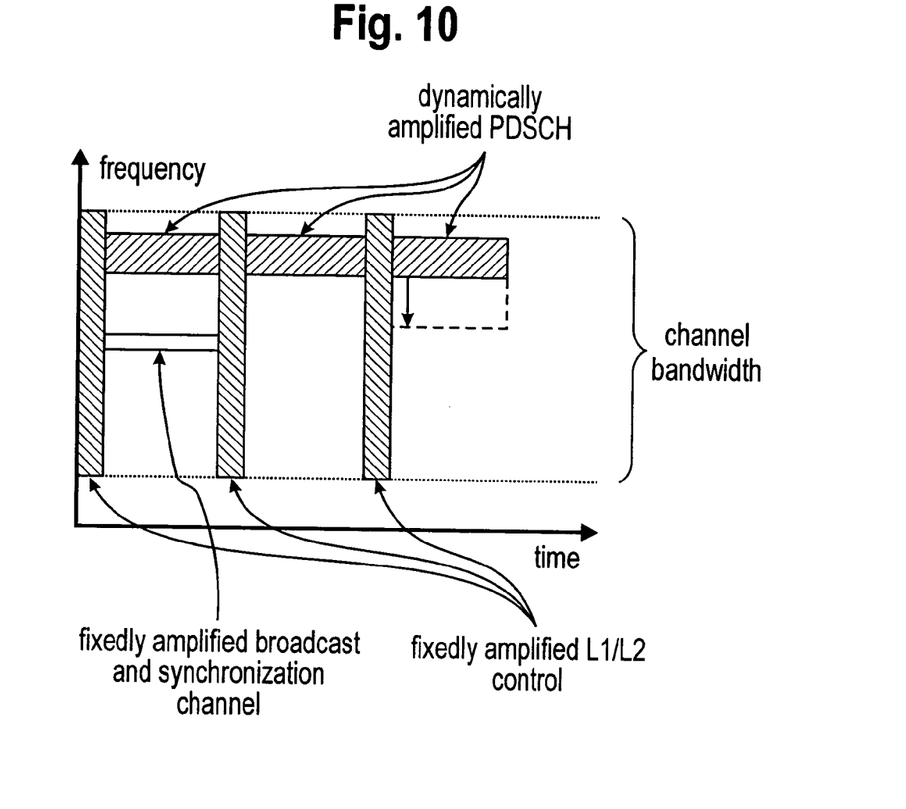
FIG. 10 shows a spectral mask with fixed and dynamic communication resources in long term evolution downlink communication as handled by the self-optimizing repeater according to the present invention.

FIG. 10 shows a spectral mask with fixed and dynamic communication resources in long term evolution LTE downlink communication as handled by the self-optimizing repeater according to the present invention.

As shown in FIG. 10, in long term evolution LTE downlink communication L1/L2 control signalling, synchronization and broadcast channels are allocated on fixed communication resources. Heretofore, FIG. 10 shows an example of fixedly and dynamically amplified communication resources in long term evolution LTE downlink communication.

Figure 11:
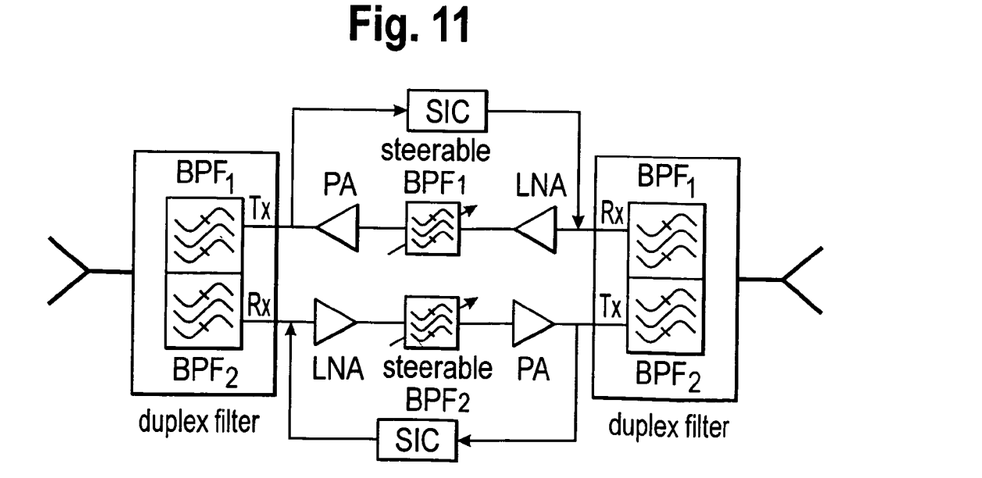
FIG. 11 shows a schematic diagram of a self-optimizing on-frequency repeater with self-interference cancellation for frequency division duplex FDD according to the present invention.

FIG. 11 shows a schematic diagram of a self-optimizing on-frequency repeater with self-interference cancellation for frequency division duplex FDD according to the present invention.

As shown in FIG. 11, in wireless communication networks based on FDD the described self-optimizing repeater system can be applied in the downlink DL and/or in the uplink UL channel separately. Heretofore, FIG. 11 shows the schematic design of a self-optimizing on-frequency repeater for FDD.

As shown in FIG. 11, the duplex filter separates DL and UL signals, which are feed to the corresponding branch. The steerable band-pass filter BPF1 and BPF2 apply the spectral mask of the self-optimizing repeater 10. Here, the downlink DL and uplink UL branch applies an individually optimized spectral mask.

As shown in FIG. 11, the low noise amplifier LNA and the power amplifier PA amplify the signal. In this example, equipment for self-interference cancellation SIC is present. More than one antenna at each side of the self-optimizing repeater 10 may be used as well.

Figure 12:
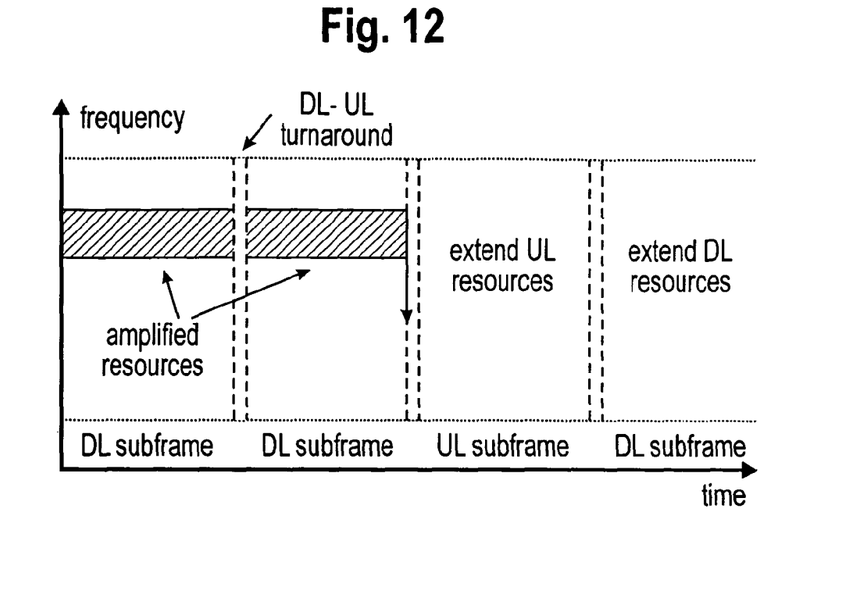
FIG. 12 shows time division duplex operation for a self-optimizing repeater according to the present invention.

FIG. 12 shows time division duplex operation for a self-optimizing repeater according to the present invention.

As shown in FIG. 12, in TDD based wireless communication networks the channel is separated in sub-frames dedicated to downlink DL and to UL. Hence, in TDD, amplified DL communication resources are located in the downlink DL sub-frame, whereas amplified uplink UL communication resources are located in the uplink UL sub-frame. The self-optimizing repeater 10 synchronizes to the alternating occurrence of downlink DL and uplink UL sub-frames. It should be noted that in wireless communication networks with variable downlink-uplink switching points, downlink uplink synchronization has to be maintained as well.

As shown in FIG. 12, in general, channel reciprocity between downlink DL and uplink UL is assumed and exploited in TDD systems. Hence, amplified communication resources should be equal in downlink DL and in uplink UL. Otherwise the channel would no longer be reciprocal.

Here, the self-optimizing repeater 10 adjusts the number of communication resources simultaneously in downlink DL and in uplink UL in order to maintain the reciprocal downlink DL and uplink UL channel. In wireless communication networks where the radio base station allocates communication resources, the starting point should be the uplink UL, because the uplink UL channel estimation is the base for the following DL (and UL) resource allocation. FIG. 12 illustrates a TDD channel. Downlink DL and uplink UL communication resources are amplified in alternation. The extension of communication resources starts in uplink UL.

Figure 13:
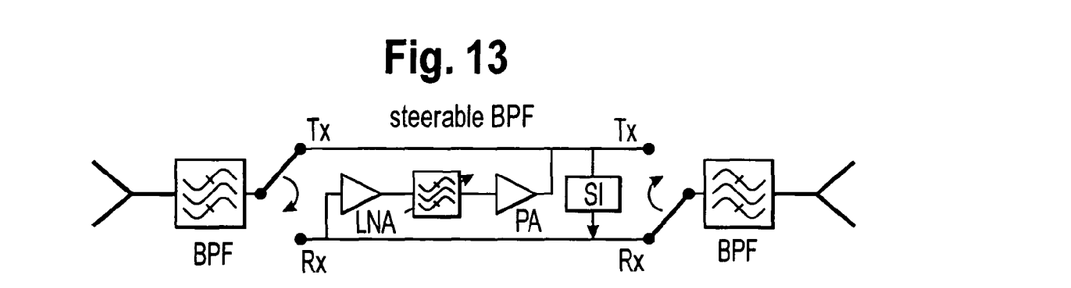
FIG. 13 shows a schematic diagram of a self-optimizing on-frequency repeater with self-interference cancellation for time division duplex TDD using dedicated antennas according to the present invention.

FIG. 13 shows a schematic diagram of a self-optimizing on-frequency repeater with self-interference cancellation for time division duplex TDD using dedicated antennas according to the present invention.

As shown in FIG. 13, the self-optimizing on-frequency repeater 10 for TDD uses dedicated antennas, one directed towards the radio base station, the other directed towards the mobile terminals. The self-optimizing repeater 10 switches between downlink DL and uplink UL during the turnaround time. The steerable band-pass filter BPF applies the spectral mask of the self-optimizing repeater 10. Since the spectral mask is equal in downlink DL and uplink UL, only one branch is necessary. A low noise amplifier LNA and a power amplifier PA amplify the signal. Like in the FDD example shown in FIG. 11, equipment for self-interference cancellation SIC is present.

Figure 14:
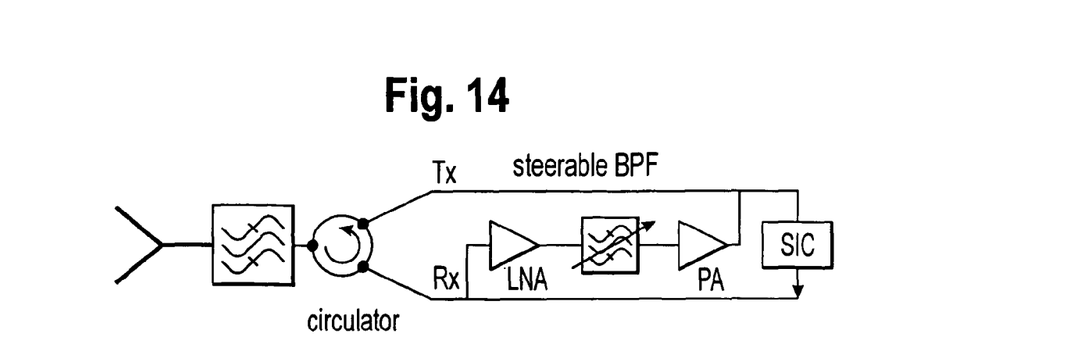
FIG. 14 shows a schematic diagram of a self-optimizing on-frequency repeater with self-interference cancellation for time division duplex TDD using a single antenna according to the present invention.

FIG. 14 shows a schematic diagram of a self-optimizing on-frequency repeater with self-interference cancellation for time division duplex TDD using a single antenna according to the present invention As shown in FIG. 14, the self-optimizing on-frequency repeater 10 for TDD uses a single antenna. A circulator separates transmission Tx and reception Rx signals. Afterwards the reception Rx signal is amplified and the optimized spectral mask is applied. In order to improve the separation of transmission Tx and reception Rx signals self-interference cancellation is performed. In a single antenna solution no synchronisation is needed. The self-optimizing repeater 10 continuously amplifies its communication resources independent whether the downlink DL or the uplink UL sub-frame is present. Downlink uplink reciprocity is maintained automatically. Due to the huge difference in transmission Tx and reception Rx power, high-efficient self-interference cancellation SIC and circulator devices would be required to separate reception Rx and transmission Tx signals.

Further to the above, according to the present invention there is also provided a computer program product directly loadable into the internal memory of a self optimizing repeater comprising software code portions for performing the method according to the present invention when the product is run on a processor of the self-optimizing repeater.

Therefore, the present invention is also provided to achieve an implementation of the inventive method steps on computer or processor systems. In conclusion, such implementation leads to the provision of computer program products for use with a computer system or more specifically a processor comprised in the self-optimizing repeater 10.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard-drives; or information convey to a computer/processor through communication media such as network and/or telephone networks via modems or other interface devices.

It should be understood that such media, when carrying processor readable instructions implementing the inventive concept represent embodiments of the present invention.

The invention claimed is:

1. A self-optimizing repeater for use in a wireless communication network that comprises a plurality of cells and that uses predetermined carrier communication resources per cell, the self-optimizing repeater comprising circuitry configured as:
   an amplifier configured to amplify a first subset of communication resources selected from said predetermined carrier communication resources;
   a monitoring unit configured to monitor traffic load on the first subset of communication resources, wherein the monitoring unit is configured to monitor traffic load by measuring the total input or output power of the amplifier or by measuring the received or transmitted power per communication resource in the first subset of communication resources; and
   an adjustment unit configured to adjust the first subset of communication resources as a function of the monitored traffic load by performing one of:
      extending the first subset of communication resources when the monitored traffic load comprises a relatively high traffic load and reducing the first subset of communication resources when the monitored traffic load comprises a relatively low traffic load; or
      increasing the amplification of the first subset of communication resources when the monitored traffic load comprises a relatively high traffic load and decreasing the amplification of the first subset of communication resources when the monitored traffic load comprises a relatively low traffic load.

2. The self-optimizing repeater of claim 1, wherein the amplifier is further configured to continuously amplify a second subset of communication resources that is different from the first subset of communication resources.

3. The self-optimizing repeater of claim 1, wherein the adjustment unit is configured to extend or reduce the first subset of communication resources while maintaining adjacency of communication resources within the first subset of communication resources.

4. The self-optimizing repeater of claim 1, wherein the adjustment unit is configured to evaluate use of communication resources prior to extension of the first subset of communication resources so as to avoid overload constellations.

5. The self-optimizing repeater of claim 1, wherein the adjustment unit is configured to operate according to an operation time scale that is larger than a scheduling time scale used for scheduling of communication resources.

6. The self-optimizing repeater of claim 1, wherein the adjustment unit is configured to adjust the first subset of communication resources in a similar manner on a downlink and on an uplink of the wireless communication network.

7. The self-optimizing repeater of claim 1 wherein the circuitry is further configured as a setup unit operative to configure an initial or maximum first subset of communication resources according to a pre-configuration during deployment of the self-optimizing repeater, according to a random configuration, or according to an interference level per communication resource.

8. A radio access sub-system for use in a wireless communication network that comprises a plurality of cells and that uses predetermined carrier communication resources per cell, the radio access sub-system comprising:
   a radio base station configured to schedule communication resources for wireless communication with at least one mobile terminal; and
   a self-optimizing repeater configured to support wireless communication with the mobile terminal and comprising circuitry configured as:
      an amplifier configured to amplify a first subset of communication resources selected from said predetermined carrier communication resources;
      a monitoring unit configured to monitor traffic load on the first subset of communication resources, wherein the monitoring unit is configured to monitor traffic load by measuring the total input or output power of the amplifier or by measuring the received or transmitted power per communication resource in the first subset of communication resources; and
      an adjustment unit configured to adjust the first subset of communication resources as a function of the monitored traffic load by performing one of:
         extending the first subset of communication resources when the monitored traffic load comprises a relatively high traffic load and reducing the first subset of communication resources when the monitored traffic load comprises a relatively low traffic load; or increasing the amplification of the first subset of communication resources when the monitored traffic load comprises a relatively high traffic load and decreasing the amplification of the first subset of communication resources when the monitored traffic load comprises a relatively low traffic load.

9. A method of operating a self-optimizing repeater in a wireless communication network that comprises a plurality of cells and that uses predetermined carrier communication resources per cell, the method comprising:
  amplifying a first subset of communication resources selected from said predetermined carrier communication resources;
  monitoring a traffic load on the first subset of communication resources, wherein said monitoring comprises measuring the total input or output power of said amplification or measuring the received or transmitted power per communication resource in the first subset of communication resources; and
  adjusting the first subset of communication resources as a function of the monitored traffic load by performing one of:
    extending the first subset of communication resources when the monitored traffic load comprises a relatively high traffic load and reducing the first subset of communication resources when the monitored traffic load comprises a relatively low traffic load; or
    increasing the amplification of the first subset of communication resources when the monitored traffic load comprises a relatively high traffic load and decreasing the amplification of the first subset of communication resources when the monitored traffic load comprises a relatively low traffic load.

10. The method of claim 9, further comprising continuously amplifying a second subset of communication resources that is different from the first subset of communication resources.

11. The method of claim 9, wherein said adjusting comprises extending or reducing the first subset of communication resources while maintaining adjacency of communication resources within the first subset of communication resources.

12. The method of claim 9, wherein said adjusting comprises evaluating use of communication resources prior to extension of the first subset of communication resources so as to avoid overload constellations.

13. The method of claim 9, wherein said adjusting operates according to an operation time scale that is larger than a scheduling time scale used for scheduling of communication resources.

14. The method of claim 9, wherein said adjusting comprises adjusting the first subset of communication resources in a similar manner on a downlink and on an uplink of the wireless communication network.

* * * * *